UNITED STATES PATENT OFFICE.

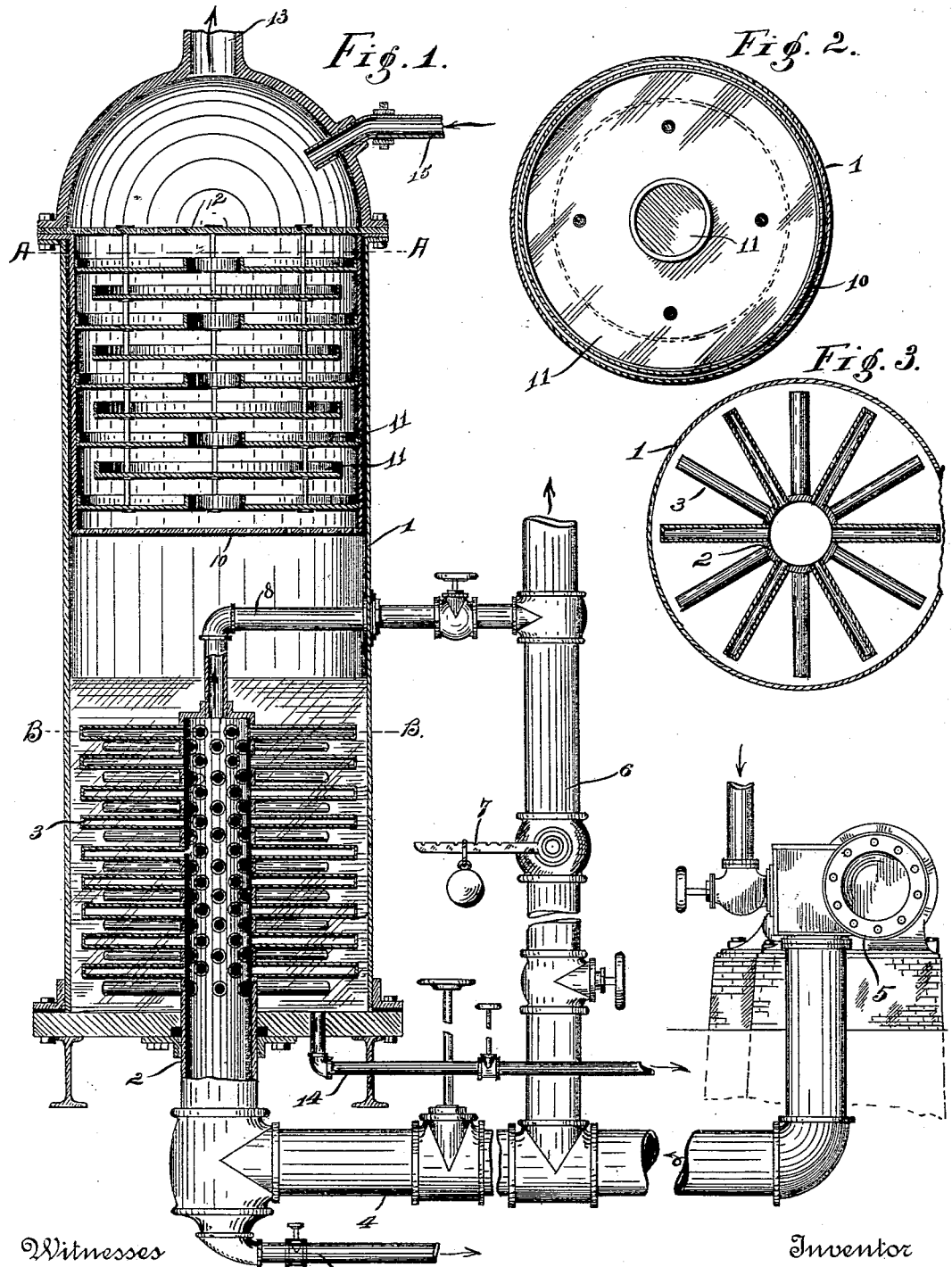

EUGENE BRETNEY, OF INDIANAPOLIS, INDIANA.

DEVICE FOR GENERATING AMMONIA-GAS.

SPECIFICATION forming part of Letters Patent No. 560,081, dated May 12, 1896.

Application filed December 17, 1894. Serial No. 532,002. (No model.)

*To all whom it may concern:*

Be it known that I, EUGENE BRETNEY, of Indianapolis, county of Marion, and State of Indiana, have invented certain new and useful Improvements in Devices for Generating Ammonia-Gas in Refrigerating and Ice-Making Machines; and I do hereby declare that the following is a full, clear, and exact description thereof, reference being had to the accompanying drawings, in which like letters refer to like parts.

My invention relates to the process of supplying ammonia-gas in refrigerating or ice-making machines, especially to the process of heating the aqua-ammonia in the generator or still, and the means of carrying out the process.

Heretofore only live steam conveyed under high pressure directly from the boiler has been used to generate ammonia-gas in refrigerating and ice-making plants, whether the system used was the compression system or the absorption system. This has necessitated an independent steam-plant for each refrigerating or ice-making machine or a proportionate increase in the capacity of the steam-plant when the refrigerating or ice-making machine was combined or used in conjunction with any other kind of machine, factory, or establishment.

The purpose of my invention is to enable one to operate a refrigerating or ice-making machine incidental to or in conjunction with some other machine, factory, or establishment requiring an engine and boiler by the incidental use of the same engine and boiler for the refrigerating or ice-making machine without modifying them or increasing their capacity. I accomplish this by using the exhaust-steam from the engine to heat the aqua-ammonia for the purpose of generating ammonia-gas instead of using live steam at a high pressure directly from the boiler. In this manner a brewery, for example, can establish an ice-making or refrigerating machine in connection with it without increasing its engine and boiler plant or the cost of running the same, and the same thing can be done with any other machine, factory, or establishment requiring an engine and boiler. The nature of this process and the means of carrying it out will more fully appear from the accompanying drawings and the following description.

Figure 1 is a central vertical section of the generator or still in an ice-making plant, showing also the pipe connections with the engine. Fig. 2 is a cross-section of the generator on the line A A, and Fig. 3 on the line B B.

The aqua-ammonia is contained in the lower portion of the generator or still 1. This liquid is heated by a steam-pipe 2, which extends up centrally through the lower end of the generator and is provided with small pipes 3, radiating in every direction. This pipe 2 is preferably a continuation of the exhaust-pipe 4, that extends from the engine 5. The diameter or capacity of the portion 2 within the generator should be substantially the same as that of the exhaust-pipe. To that end the lower end of the steam-pipe 2 is not contracted as heretofore, but is large. This construction is very valuable in enabling the exhaust-steam to enter freely at the best pressure to accomplish its work. The exhaust-pipe 4 is provided with suitable valves and has extending from it an escape-pipe 6 for the purpose of regulating the pressure and amount of the exhaust-steam entering the generator and prevent back pressure of the exhaust-steam on the engine. It is provided with suitable cut-off valves and a regulating-valve 7, which is so set that the exhaust-steam in the generator will be under only enough pressure, say about five pounds, to cause it to penetrate all the radiating-pipes 3. The surplus of exhaust-steam in the generator is carried out of it through the outlet-pipe 8, whose purpose is to maintain a flow of exhaust-steam through the generator. It is preferably smaller than the pipe 2 and extends from the top of the latter.

The exhaust-steam passing out through the pipe 6 may, if desired, be used for distilling water to be frozen. At the lower end of the steam-pipe 2 is a small outlet-pipe 9 for the purpose of removing any water that condenses in the pipe 2 and conveying it also to the distilled-water tank of the plant.

The ammonia-gas which is separated from the water in the lower part of the generator or still 1 rises through the perforated plate 10 and the circuitous passage-way above it caused by the pans 11, placed as shown. The diameter of one pan is nearly as great as that of the generator, while the pans above and below it are annular, with a central opening, so that the gas passes centrally through one pan and around the periphery of the next pan, and so on out through the perforated partition 12 and the pipe 13, by which the gas under the pressure which it has acquired is conveyed to the condenser.

The weak liquor left in the lower part of the tank after the gas has escaped from it passes out through the pipe 14 to the absorber or place where it is reunited with the gas to form what is termed "strong" liquor, which by a suitable pump is forced through a pipe 15 into the upper end of the generator or still. Its passage down to the lower end of the generator is slow by reason of the series of pans 11, over whose edges it must flow. The purpose of this arrangement is to enable the warm rising ammonia-gas to become cool by contact with the strong liquor and also the strong liquor entering the tank to become warm by its contact with the gas. This construction contributes to the successful action of the exhaust-steam upon the aqua-ammonia below.

From the foregoing description it is observed that to supply ammonia-gas to a refrigerating or ice-making machine I use exhaust-steam—steam which would otherwise be a wasted product—and procure a valuable and beneficial result from an agency heretofore or at least in most plants not used, and therefore the expense of operating a refrigerating or ice-making machine may be by my process materially reduced.

What I claim as my invention, and desire to secure by Letters Patent, is—

1. The combination of an exhaust-pipe of a steam-engine, an ammonia-gas-generating tank, heating-pipes in said tank, an inlet-pipe to said heating-pipes from one point in the exhaust-pipe, and an outlet-pipe from said heating-pipes to a further point in said exhaust-pipe, substantially as described.

2. The combination of an exhaust-pipe of a steam-engine, an ammonia-gas-generating tank, heating-pipes in said tank, an inlet-pipe to said heating-pipes from one point in the exhaust-pipe, an outlet-pipe from said heating-pipes to a further point in said exhaust-pipe, and a regulating-valve in said exhaust-pipe located between said upper and lower points, substantially as described.

3. In an ammonia-gas generator the combination of the tank A, pipes conducting steam to and through the tank, radiating-pipes connected to the steam-pipe interior to the tank, a pipe 6 shunting said interior pipe by forming a direct connection between the pipe before entering and after leaving the tank, substantially as described.

4. In an ammonia-gas generator, the combination of the tank A, pipes conducting steam to and through the tank, radiating-pipes connected to the steam-pipe interior to the tank, a pipe 6 shunting said interior pipe by forming a direct connection between said pipe before entering and after leaving the tank, and a regulating-valve located in said shunt-pipe, substantially as described.

In witness whereof I have hereunto set my hand this 13th day of December, 1894.

EUGENE BRETNEY.

Witnesses:
V. H. LOCKWOOD,
L. A. MONROE.